(12) United States Patent
Duan et al.

(10) Patent No.: US 10,293,420 B2
(45) Date of Patent: May 21, 2019

(54) ADJUSTABLE BLADE GUIDE FOR A BAND SAW

(71) Applicant: Rikon Power Tools, Inc., Billerica, MA (US)

(72) Inventors: Wuzheng Duan, Qingdao Shandong (CN); Jiquan Jiang, Qingdao Shandong (CN)

(73) Assignee: Rikon Power Tools, Inc., Billerica, MA (US)

( * ) Notice: Subject to any disclaimer, the term of this patent is extended or adjusted under 35 U.S.C. 154(b) by 75 days.

(21) Appl. No.: 14/716,623

(22) Filed: May 19, 2015

(65) Prior Publication Data

US 2016/0207127 A1    Jul. 21, 2016

(30) Foreign Application Priority Data

Jan. 15, 2015 (CN) .................... 2015 2 0027341 U (51) Int. Cl.
     *B23D 55/08*      (2006.01)

(52) U.S. Cl.
     CPC .................. *B23D 55/082* (2013.01)

(58) Field of Classification Search
     CPC ...... B23D 55/082; B23D 55/04; B23D 55/06; B23D 55/88; B23D 55/084; B23D 55/086; Y10T 83/8889; Y10T 83/8886; Y10T 83/888; Y10T 83/8881
     See application file for complete search history.

(56) References Cited

U.S. PATENT DOCUMENTS

| | | | | |
|---|---|---|---|---|
| 843,097 A | * | 2/1907 | Rathke ................. | B23D 55/082 83/824 |
| 876,816 A | * | 1/1908 | Lippmann ............... | B27B 13/10 83/820 |
| 1,870,555 A | * | 8/1932 | Burton ................. | B23D 55/046 83/441.1 |
| 2,250,324 A | * | 7/1941 | Baker ..................... | B27B 13/10 403/362 |
| 2,670,767 A | | 3/1954 | Miller | |
| 2,688,990 A | * | 9/1954 | Bushey .................. | B27B 13/10 83/820 |
| 2,749,951 A | * | 6/1956 | Tetzner ................... | B27B 13/10 83/545 |

(Continued)

OTHER PUBLICATIONS

Taunton's Complete Illustrated Guide to Bandsaws, Section 1: The Versatile Bandsaw (Copyright 2012).
New Woodworker Review—Carter Bandsaw Roller Guides (Nov. 2005).

*Primary Examiner* — Jonathan G Riley
(74) *Attorney, Agent, or Firm* — Wolf, Greenfield & Sacks, P.C.

(57) ABSTRACT

Adjustable blade guide assemblies and their methods of use are described. An adjustable blade guide assembly includes two lateral blade guides arranged to support opposing sides of a blade and a rear blade guide arranged to support a rear edge of the blade. The blade guides are moveable relative to the blade. The blade guide assembly includes biasing members associated with each blade guide which urge the blade guides in a direction away from the blade. Locking interfaces associated with each blade guide restrict displacement of the blade guides relative to the blade when the locking interfaces are in a locked configuration.

11 Claims, 6 Drawing Sheets

(56) References Cited

U.S. PATENT DOCUMENTS

| | | | | |
|---|---|---|---|---|
| 2,964,076 | A * | 12/1960 | Debs | B27B 13/10 83/168 |
| 2,986,181 | A | 5/1961 | Carter | |
| 3,534,647 | A * | 10/1970 | Mills | B23D 55/082 83/820 |
| 3,643,536 | A * | 2/1972 | Alexander | B27B 13/10 83/820 |
| 3,817,142 | A * | 6/1974 | Fingerle | B26D 1/54 83/820 |
| 4,926,728 | A * | 5/1990 | Kawabata | B23D 53/04 269/172 |
| 4,926,731 | A * | 5/1990 | Kawabata | B23D 53/04 269/172 |
| 4,958,970 | A * | 9/1990 | Rose | F16B 31/028 411/12 |
| 4,972,746 | A * | 11/1990 | Ohnishi | B23D 55/005 83/820 |
| 5,271,306 | A * | 12/1993 | Ohnishi | B23D 55/005 83/820 |
| 6,463,836 | B1 * | 10/2002 | Snodgrass, Jr. | B23D 55/082 83/13 |
| 2002/0023527 | A1 * | 2/2002 | Wood | B23D 55/086 83/821 |
| 2008/0110315 | A1 * | 5/2008 | Wang | B23D 55/082 83/829 |
| 2012/0204700 | A1 * | 8/2012 | Tokiwa | B23D 55/082 83/820 |

* cited by examiner

ADJUSTABLE BLADE GUIDE FOR A BAND SAW

RELATED APPLICATIONS

This application claims foreign priority benefits under 35 U.S.C. § 119(a)-(d) or 35 U.S.C. § 365(b) of Chinese Application No. 201520027341.8, filed Jan. 15, 2015.

FIELD

Disclosed embodiments are related to blade guides for band saws.

BACKGROUND

Band saws typically include blade guides arranged to support a span of a band saw blade to ensure that the blade does not twist, turn, or otherwise become misaligned during a cutting process. The support provided by a blade guide may allow an operator to perform complex cuts such as arcs or small-radius turns while maintaining a desired degree of precision. The position of a blade guide relative to the blade is adjusted by an operator to a position that provides sufficient support while not hindering movement of the blade; typically blade guides are positioned to provide a small clearance between the blade and the blade guide. When the blade on a band saw is changed or adjusted, the blade guides are also typically adjusted accordingly.

SUMMARY

In one embodiment, a blade guide assembly includes at least one blade guide movable relative to a blade and at least one biasing member associated with the blade guide. The biasing member urges the blade guide in at least one direction relative to the blade. The blade guide assembly further includes a locking mechanism movable between a locked configuration and an unlocked configuration. The locking mechanism substantially restricts displacement of the blade guide relative to the blade when the locking mechanisms is in the locked configuration.

In another embodiment, a blade guide assembly includes a first blade guide arranged to support a first side of a blade, a second blade guide arranged to support a second side of a blade, and a rear blade guide arranged to support a rear edge of a blade. The blade guide assembly further includes a first biasing member configured to urge the first blade guide away from the first side of the blade, a second biasing member configured to urge the second blade guide away from the second side of the blade, and a third biasing member configured to urge the third blade guide away from the rear edge of the blade. First, second, and third locking mechanisms are associated with the first, second, and third blade guides, respectively; each locking mechanism is movable between a locked configuration and an unlocked configuration. The first, second, and third locking mechanisms substantially restrict displacement of the first, second, and third blade guides, respectively, when the locking mechanisms are in the locked configuration.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The inventors have recognized that conventional band saw blade guides may be difficult and/or time consuming to properly set or adjust. For example, when changing the blade on a band saw, the position of each blade guide is adjusted to provide a proper clearance between the blade guide and the blade; such adjustment often requires careful positioning of the blade guides as well as the use of tools to loosen or tighten a locking mechanism that retains the blade guide in a desired position. Moreover, typical blade guide assemblies do not allow for easy fine-adjustment of the position of the blade guides. In view of the above, the inventors have recognized the benefits associated with providing a blade guide assembly that affords simple and fast adjustment of the position of the blade guides, including fine-adjustment. For example, the inventors have found that a blade guide assembly that includes biasing members associated with each blade guide may provide for such simple adjustment of the blade guides. Further, adjustment may be made without requiring the use of tools.

In some embodiments a blade guide assembly includes one or more blade guides positioned to support a blade. For example, a blade guide assembly may include first and second blade guides positioned to support opposing sides of a blade to restrict lateral motion of the blade, as well as a third blade guide positioned to support a rear edge of the blade. The position of the blade guides may be adjusted independently, and a locking mechanism may be provided for each blade guide, as described in more detail below, to selectively retain the blade guides in a desired position after adjustment. Depending on the particular embodiment, a blade guide may be adjusted to have a small clearance from the blade when no force is applied to the blade from a work piece. During a cutting process, a work piece is pushed through the blade, which may result in forces being applied to the blade that may cause a portion of the blade to contact the blade guide. Consequently, the blade guide acts to limit the deformation of the blade and acts to limit the blade from turning, twisting, or otherwise becoming misaligned during a cutting process.

According to one aspect of the present disclosure, a blade guide assembly may include one or more biasing members associated with the blade guides that facilitate simple adjustment of the blade guides. For example, in some embodiments, the biasing members may be arranged to urge the blade guides away from the blade. When locking mechanisms associated with the blade guides are moved to an unlocked or loosened position, the biasing members cause the blade guides to automatically move away from the blade. An operator may subsequently push the blade guide towards the blade to adjust the blade guide to a desired position, and then lock the locking mechanism to retain the blade guide in the desired position. In this manner, an operator can easily adjust the position of the blade guides by loosening and/or unlocking the locking mechanism with one hand, pushing the blade guides inward with finger pressure to the appropriate position with the other hand, and then locking the guides in place. If the blade guides are not properly positioned, the operator need only lighten the force on his or her fingers so that the guides then move outward under the bias of the biasing member. The operator can then re-tighten or lock the locking mechanism. Unlike other arrangements, the operator need not physically grasp the guides to pull them to a new adjusted position. Rather, a light finger pressure to overcome the bias of the biasing member is all that is needed to reposition the guides.

In certain embodiments, a biasing member may provide a resistance force during adjustment which may further aid in positioning the blade guides, including allowing for simple fine-adjustment. Without wishing to be bound by theory, a resistance force may be sufficient to limit undesirable small movements of the blade guide during positioning and therefore allow an operator to consistently and precisely position a blade guide at a desired position relative to a blade.

For the sake of clarity, the presently disclosed embodiments are directed to blade guides for band saws. However, the present disclosure is not limited to band saws. Instead the blade guides could be incorporated into jig saws, scroll saws, reciprocating saws, or any other suitable cutting system.

Turning now to the figures, specific non-limiting embodiments of blade guide assemblies are described in further detail. While specific embodiments are described below, it should be understood that the various components, systems, and methods of operation described herein may be combined in any suitable fashion as the current disclosure is not so limited.

Figure 1:
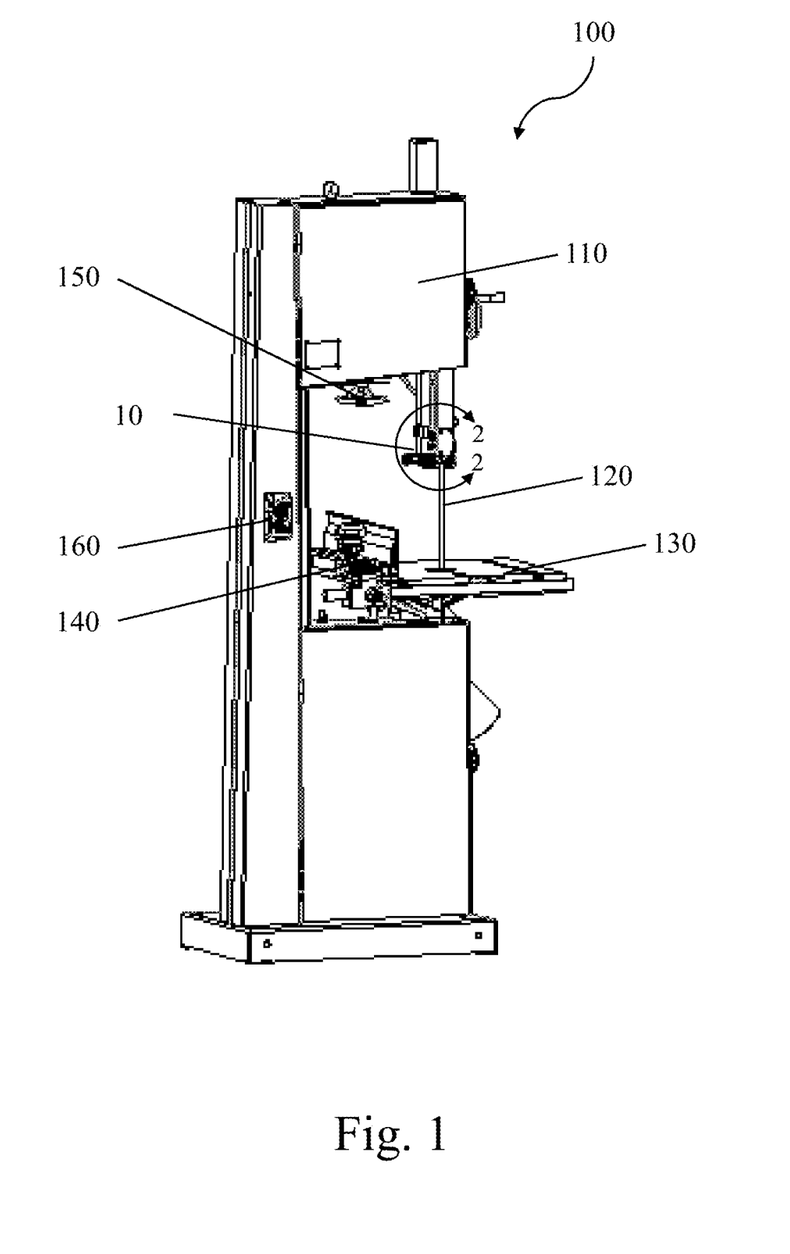
FIG. 1 is a perspective view of a band saw.

FIG. 1 depicts one embodiment of a band saw 100 in which a blade guide assembly as described herein may be used. The band saw includes including a saw housing 110, a continuous saw blade 120, a work table 130, a fence system 140 to guide a work piece, a blade tensioner 150, and a switch 160. A first upper blade guide assembly 10 is disposed above the table, and a second lower blade guide assembly (not depicted) may be disposed below the table. The span of the blade between the upper and lower blade guide assemblies is thus supported by the blade guides such that the blade is substantially prevented from twisting, turning, or otherwise becoming misaligned during cutting.

Figure 2:
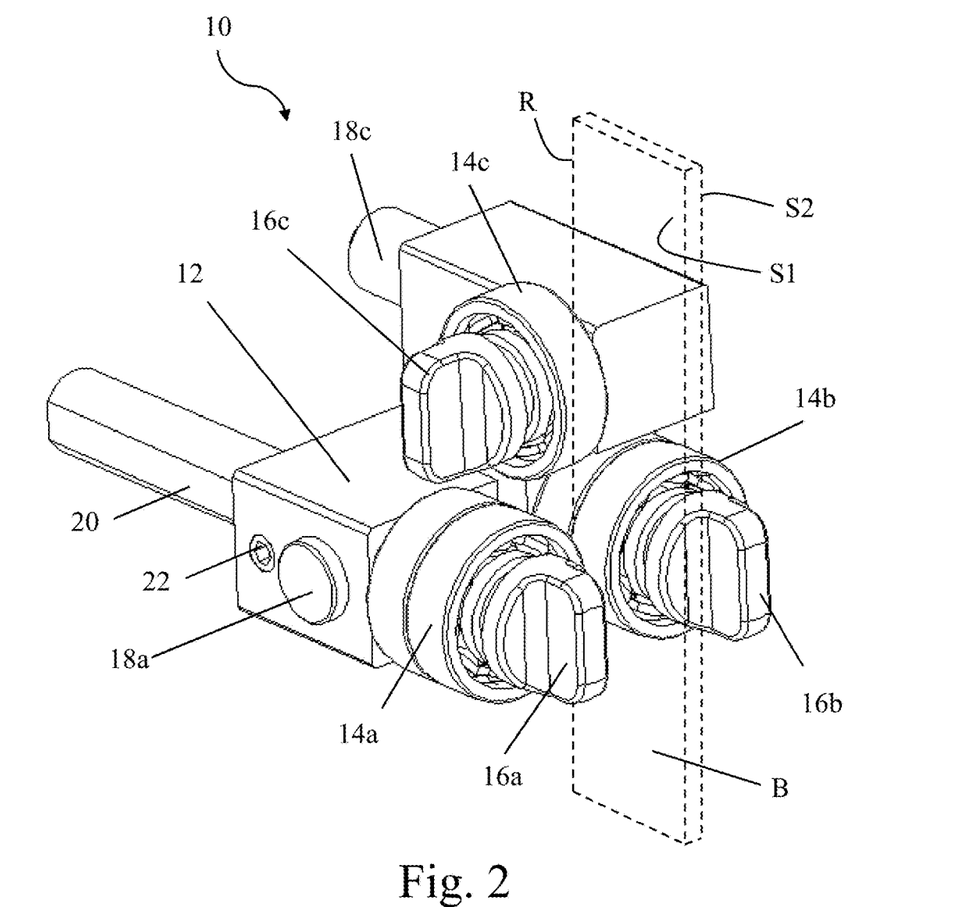
FIG. 2 is a perspective view of one embodiment of a blade guide assembly encircled by line 2-2 of FIG. 1.
Figure 3:
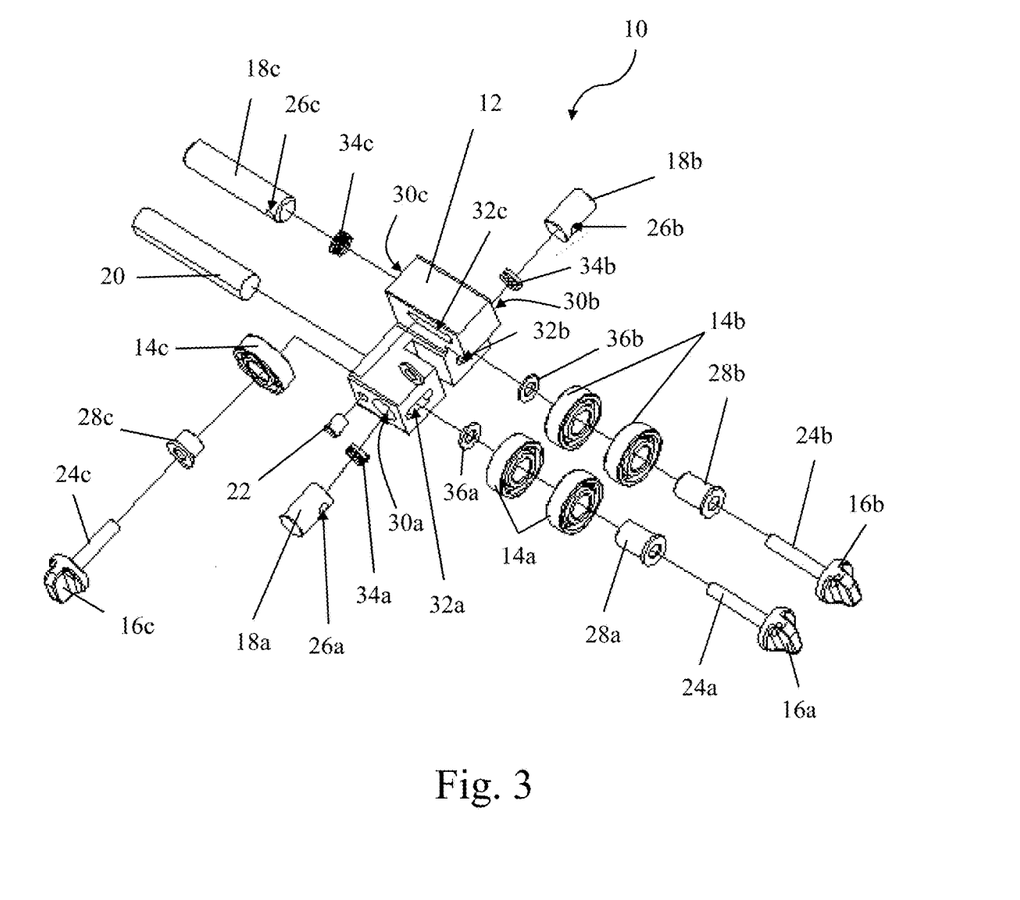
FIG. 3 is an exploded view of the blade guide assembly of FIG. 2.

FIGS. 2 and 3 depict one embodiment of a blade guide assembly 10 including a housing 12, two lateral blade guides 14a and 14b arranged to support the sides S1 and S2 of a blade B, and a rear blade guide 14c arranged to support the rear edge R of the blade. Locking handles 16a, 16b, and 16c are arranged to selectively lock the lateral and rear blade guides, respectively, in a desired position relative a blade. The lateral blade guides are coupled to positioning rods 18a and 18b such that displacement of the positioning rods results in a corresponding displacement of the blade guides; the rear blade guide is similarly coupled to a positioning rod 18c. The blade guide assembly 10 is attached to a band saw via mounting shaft 20 and set screw 22. It should be understood that the blade guide assembly may be mounted on any suitable band saw, including as a retrofit part on existing band saws. Depending on the particular embodiment, the blade guide assembly may be movable on the mounting shaft to allow for gross adjustment, or alternatively the blade guide assembly may have only a single mounted position on the mounting shaft and may not be adjustable, as the disclosure is not so limited.

Figure 6:
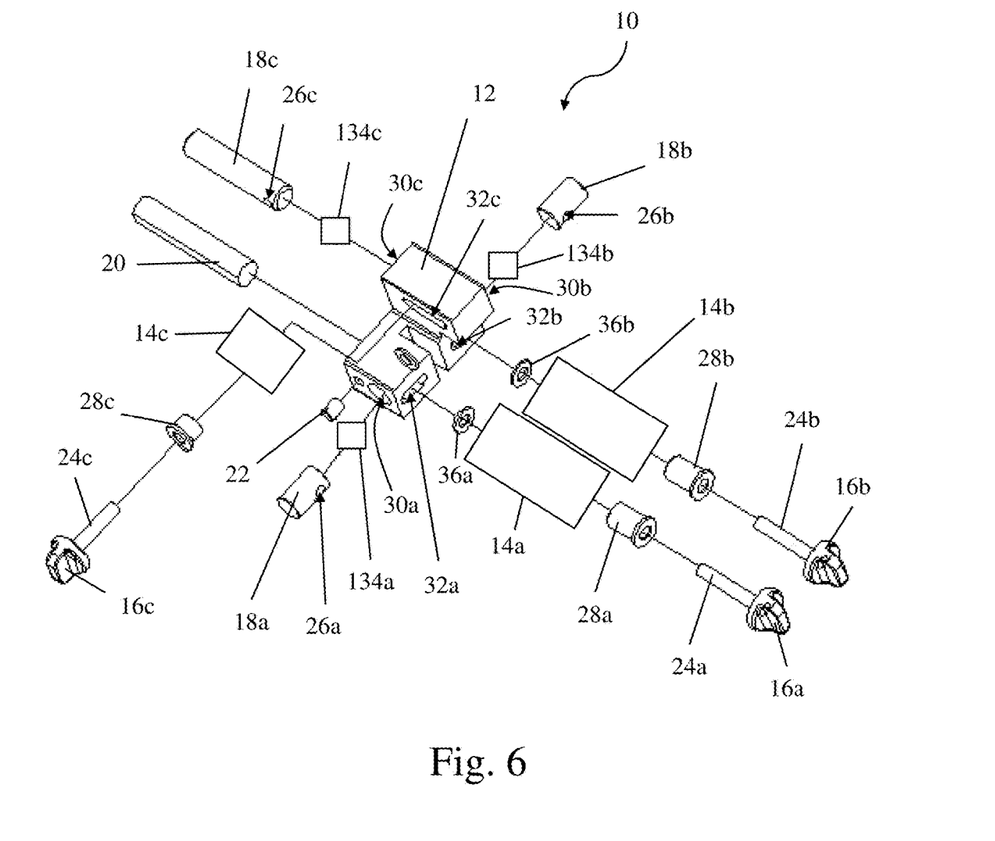
FIG. 6 is an exploded view of another embodiment of a blade guide assembly.

In the depicted embodiment, the blade guides 14 are cylindrical rollers configured such that the outer surface of the cylinders supports the blade. The lateral blade guides 14a and 14b each comprise two rollers; such an arrangement may allow for a blade guide to provide support for a wider blade. In other embodiments, the lateral blade guides may have only a single roller, or alternatively, more than two rollers. Accordingly, a blade guide may include any suitable number of rollers and be configured to support a blade with any suitable width. Depending on the particular embodiment, the rollers may include bearings such as ball bearings to facilitate rotation of blade guides, and therefore reduce friction between the blade guides and the blade. Other guides may be employed. For example, FIG. 6 depicts an exploded view of a blade guide similar to the embodiment shown in FIG. 3. In this embodiment, blade guides 14a, 14b, and 14c may include blocks, such as graphite blocks or other low friction gliding surfaces, as the present disclosure is not limited in this regard.

As best illustrated by FIG. 2, the locking handles 16a, 16b, and 16c are attached to shafts 24a, 24b, and 24c which are received through the blade guides 14 and bushings 28a, 28b, and 28c, respectively. The bushings may further facilitate rotation of the blade guides; however, it should be understood that bushings may not be included in some embodiments, and instead the blade guides may be provided directly on the shafts 24. Depending on the particular embodiment, the shafts and bushings may have any suitable length. For example, in the depicted embodiment, the lateral blade guides include two rollers whereas the rear blade guide includes only a single roller; accordingly, the shafts 24a and 24b and bushings 28a and 28b associated with the lateral blade guides have a longer length than those associated with the rear blade guide.

The housing 12 includes pockets 30a, 30b, and 30c constructed and arranged to receive biasing members 34a, 34b, and 34c, as well as positioning rods 18a, 18b, and 18c, respectively. In the depicted embodiment, the biasing members are coil springs which are received in the pockets before the rods. The coil springs are configured to urge the positioning rods outward toward the exterior of the blade guide assembly 10, away from the saw blade. The coil springs also provide a resistance force when the positioning rods are pressed inwards toward the saw blade. Referring again to FIG. 2, the shafts 24a, 24b, and 24c are received through channels 32a, 32b, and 32c on the housing, and into holes 26a, 26b, and 26c in the positioning rods 18a, 18b, and 18c, respectively. An end portion of the shafts 24 and the holes 26 may include an interface such as complementary screw threads such that the shafts may screw into the threaded holes 26 to attach the blade guides to the positioning rods.

Depending on the particular embodiment, a screw interface between shafts 24 and positioning rods 18 may also function as a tool-free, selective locking mechanism to lock the blade guides 14 in place at a desired position. For example, tightening of the screw interface by rotating the locking handles 16 may apply a compressive force between the locking handles 16 and the positioning rods 18 against the housing 12. This clamping force may provide a sufficient frictional force between the blade guides and the housing to substantially limit displacement of blade guides relative to the housing. In the depicted embodiment, washers 36a and 36b are provided between the lateral blade guides 14a and 14b and the housing. The washers may aid in distributing the compressive force applied by the locking handle and may therefore aid in providing a secure locking force. However, it should be understood that washers may not be provided in some embodiments, as the disclosure is not so limited. For example, a frictional locking or clamping force may be applied directly between the housing and a blade guide.

Figure 4A:
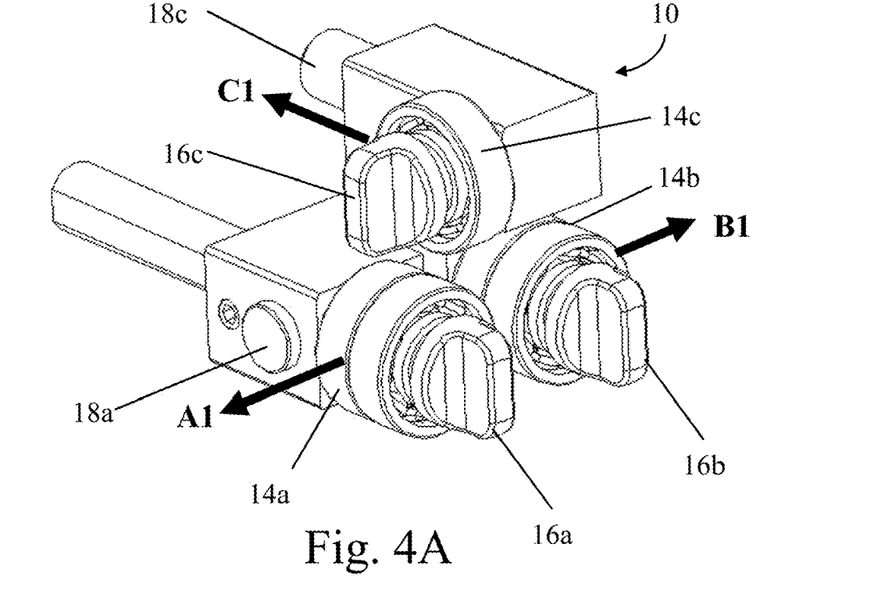
FIGS. 4A and 4B depict the blade guide assembly of FIG. 2 during adjustment.
Figure 4B:
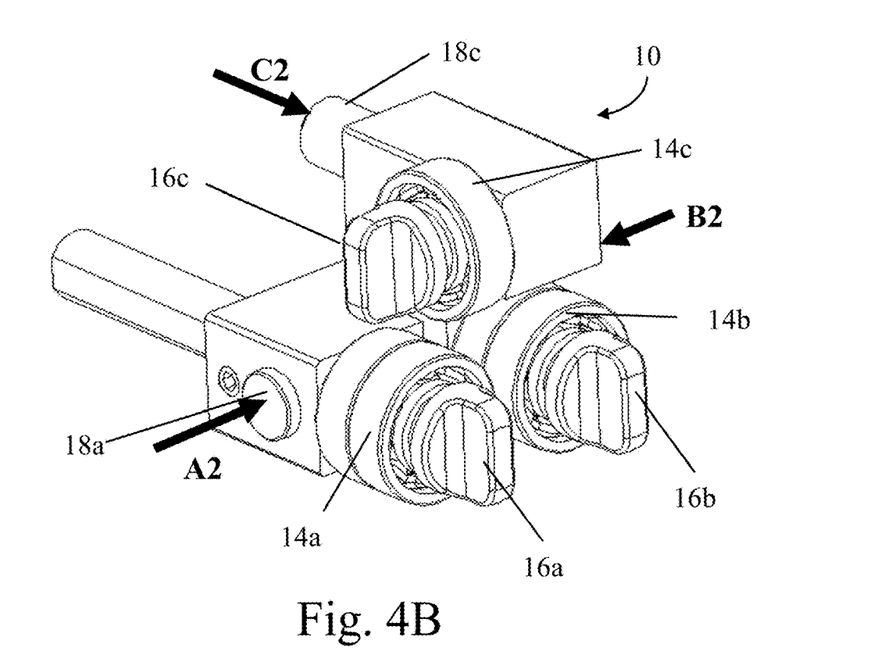

Having described various components of a blade guide assembly, its method of use is described in more detail with reference to FIGS. 4A and 4B. Locking handles 16a, 16b, and 16c, which are generally shaped as a wing-knob that can be rotated by hand, are loosened, for example by turning the locking handles to partially unscrew the shafts 24 from holes 26 such that the blade guides are moved to an unlocked configuration. In the unlocked configuration, the spring force from the biasing members 34 pushes the positioning rods 18, and therefore the attached blade guides 14, outwards, as illustrated by FIG. 4A. The lateral blade guides 14a and 14b are pushed away from the sides of the blade along directions A1 and B1, respectively; the rear blade guide 14c is similarly pushed rearward along direction C1 away from the rear edge of the blade. An operator may subsequently move the lateral blade guides inward towards the blade by pressing on the positioning rods along directions A2 and B2, respectively, as illustrated in FIG. 4B. The rods 18a and 18b may be squeezed together such that the guides are positioned simultaneously; however each may be positioned independently, as the present disclosure is not so limited. The rear blade guide is similarly moved towards the rear edge of the blade by pushing the rear positioning rod along direction C2. Typically the rear guide is adjusted independently of the lateral blade guides. When the blade guides reach a desired position, an operator may tighten or otherwise lock the locking handles to retain the blade guides in the desired position.

Figure 5:
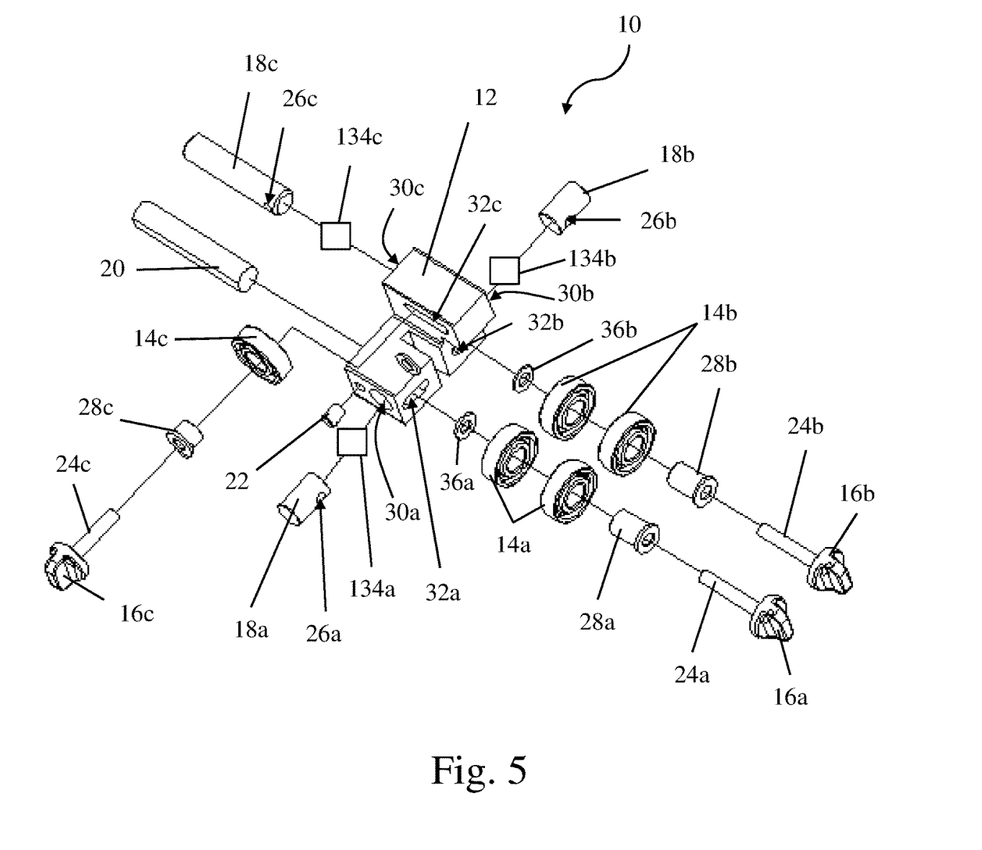
FIG. 5 is an exploded view of one embodiment of a blade guide assembly.

Although a coil spring has been depicted for a biasing member in FIG. 3, the biasing member is not limited to only a coil spring. For example, FIG. 5 depicts an exploded view of a blade guide similar to the embodiment shown in FIG. 3. In this embodiment, the biasing members 134a, 134b, and 134c may include, but are not limited to, a torsion spring, a leaf spring, a wave spring, a magazine spring, a gas spring, an elastic rod, an elastic band, or any other suitable structure or device capable of applying a suitable force to a blade guide and/or a positioning rod associated with a blade guide. Additionally, while a biasing member has been depicted as applying a pushing force to a blade guide in a particular direction, a biasing member may also be configured to apply a pulling force. For example, a biasing member such as an elastic band may be attached to an outer surface of a blade guide assembly housing and apply a tensile restoring force to a blade guide when the blade guide is displaced inwards towards the blade. Moreover, while a biasing member has been described as being configured to urge a blade guide away from a blade, the current disclosure is not so limited. For example, in some embodiments, a biasing member may instead be arranged to urge a blade guide towards a blade. In such embodiments, the biasing member may cause a blade guide to contact the blade when the locking handle is in the unlocked configuration, and an operator may adjust the blade guide by pulling the blade guide or a positioning member associated with the blade guide away from the blade to adjust the blade guide to a desired position. In view of the above, it should be understood that a blade guide assembly may include any suitable biasing member arranged to apply a biasing force in any suitable direction.

It should be understood that a blade guide assembly may include any suitable types of blade guides which provide a low friction gliding surface to support a blade. For example, blade guides may include rollers with, or without, bearings to reduce friction, as described above. While a roller has been depicted as supporting a blade with the outer surface of the roller, in some embodiments, a roller may be oriented such that the face of the roller supports the blade. Alternatively, blade guides may be formed as prismatic blocks with any suitable cross sectional shape. In some embodiments, a single blade guide assembly may include a combination of different types of blade guides. For example, in one embodiment, a blade guide assembly may include block style blade guides for the lateral blade guides and a roller bearing for the rear blade guide. Regardless of the particular type or style, a blade guide may include a through hole to accommodate a shaft to attach the blade guide to a blade guide assembly and allow for adjustment of the position of the blade guide relative to the blade, as described above. Further, it should be understood that a blade guide may be made from any suitable material, including, but not limited to, metals such as steel or aluminum alloys, ceramics such as graphite, plastics, or woods.

While a screw locking mechanism is described above, other locking mechanisms are also contemplated. For example, other configurations capable of applying a compressive force between a blade guide and a housing may be suitable, such as an over center latch, a spring latch, or a compression latch. Alternatively, a locking handle and shaft may be configured to achieve an interference fit with another component in a blade guide assembly. For example, a shaft may have a tapered portion which achieves an interference fit with a channel in the blade guide housing when an operator applies a compressive force along the shaft. In other embodiments, a locking interface may not rely on a frictional interaction between a blade guide and the housing to achieve a locked configuration. For example, a blade guide assembly may include a linear ratchet within a housing and a pawl associated with a blade guide; the ratchet and pawl may be selectively moveable between a locked configuration in which the pawl engages a tooth on the ratchet and an unlocked configuration in which the ratchet and pawl are not engaged. In one embodiment, rotation of a locking handle may selectively move a ratchet and pawl between the locked and unlocked configurations. Furthermore, although the embodiments described herein include a tool-free interface to move a locking mechanism between a locked configuration and an unlocked configuration, in some embodiments, the interface may not be tool-free. For example, a tool such as a wrench or screwdriver may be required to achieve a suitable locking force. In view of the above, it should be understood that any suitable locking mechanism may be included to retain a blade guide at a desired position relative to a blade.

Although the blade guides have been depicted and described as being independently adjustable, the present disclosure is not so limited. For example, in some embodiments, one or more blade guides may be fixed in place and may not be adjustable, while one or more other guides are adjustable. Alternatively, two or more blade guides may be coupled such that a displacement of a first blade guide results in a corresponding displacement of the other blade guides. For example, two lateral blade guides may be coupled such that the displacement of the lateral blade guides is symmetric about a plane corresponding to the position of a blade. Moreover, while a separate biasing member has been depicted as being associated with each blade guide, in some embodiments, one or more blade guides may not have an associated biasing member.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A blade guide assembly configured to be attached to a band saw including a blade, the blade guide assembly comprising:
    a housing;
    a blade guide configured to be linearly moveable relative to a blade and to support a surface of the blade;
    a biasing member associated with the blade guide;
    a locking mechanism moveable between a locked configuration and an unlocked configuration, wherein the locking mechanism substantially restricts displacement of the blade guide relative to the blade when the locking mechanism is in the locked configuration, and, when the locking member is in the unlocked configuration, the biasing member linearly displaces the blade guide in along a direction away from the blade and perpendicular to the surface of the blade that the blade guide is arranged to support; and
    a positioning member associated with the blade guide, wherein the positioning member supported by the housing such that at least a portion of the positioning member is slidably displaceable in a linear direction within the housing, and wherein the positioning member is configured to be pressed by a user to displace the blade guide toward the surface of the blade that the blade guide is arranged to support when the locking mechanism is in the unlocked configuration.

2. The blade guide assembly of claim 1, wherein the biasing member comprises at least one selected from the group of a coil spring, a wave spring, a leaf spring, a gas spring, an elastic rod, and an elastic band.

3. The blade guide assembly of claim 1, wherein the locking mechanism is a screw interface.

4. The blade guide assembly of claim 3, wherein the locking mechanism is movable between the locked and unlocked configurations via a tool-free interface.

5. The blade guide assembly of claim 1, wherein the blade guide comprises a roller or a block.

6. A blade guide assembly configured to be attached to a band saw including a blade, the blade guide assembly comprising:
    a housing;
    a first blade guide provided on the housing and arranged to support a first side of a blade, the first blade guide configured to be linearly displaceable relative to the blade along a first axis;
    a second blade guide provided on the housing and arranged to support a second side of a blade opposite the first side, the second blade guide configured to be linearly displaceable relative to the blade along the first axis;
    a rear blade guide provided on the housing and arranged to support a rear edge of a blade the rear blade guide configured to be linearly displaceable relative to the blade along a second axis perpendicular to the first axis;
    a first biasing member associated with the first blade guide;
    a second biasing member associated with the second blade guide;
    a third biasing member associated with the rear blade guide;
    a first locking mechanism associated with the first blade guide, wherein the first locking mechanism is movable between an unlocked configuration and a locked configuration, the first locking mechanism substantially restricts displacement of the first blade guide when in the locked configuration, and the first biasing member is configured to displace the first blade guide in a direction away from the first side of the blade when the first locking mechanism is in the unlocked configuration;
    a second locking mechanism associated with the second blade guide, wherein the second locking mechanism is movable between an unlocked configuration and a locked configuration, the second locking mechanism substantially restricts displacement of the second blade guide when in the locked configuration, and the second biasing member is configured to displace the second blade guide in a direction away from the second side of the blade when the second locking mechanism is in the unlocked configuration; and
    a third locking mechanism associated with the rear blade guide, wherein the third locking mechanism is movable between an unlocked configuration and a locked configuration, the third locking mechanism substantially restricts displacement of the rear blade guide when in the locked configuration, and the third biasing member is configured to displace the rear blade guide in a direction away from the rear edge of the blade when the third locking mechanism is in the unlocked configuration.

7. The blade guide assembly of claim 6, wherein the first, second, and third biasing members comprise at least one selected from the group of a coil spring, a wave spring, a leaf spring, a gas spring, an elastic rod, and an elastic band.

8. The blade guide assembly of claim 6, wherein each of the first, second, and third locking mechanisms comprise a screw interface.

9. The blade guide assembly of claim 8, wherein the first, second, and third locking mechanisms are movable between the locked and unlocked configurations via a tool-free interface.

10. The blade guide assembly of claim 6, wherein each of the first, second, and third blade guides comprise a roller or a block.

11. A blade guide assembly attachable to a band saw including a blade, the blade guide assembly comprising:
    a housing;

a blade guide means for supporting a surface of a blade, the blade guide means movable relative to the blade;

a locking means for selectively restricting movement of the blade guide means relative to the blade;

a biasing means associated with the blade guide means for displacing the blade guide means away from the surface of the blade when the locking means is in an unlocked configuration; and a positioning means supported by the housing such that at least a portion of the positioning means is slidably displaceable within the housing, wherein the positioning means is associated with the blade guide means for displacing the blade guide means towards the surface of the blade when pressed by a user.

\* \* \* \* \*

UNITED STATES PATENT AND TRADEMARK OFFICE
CERTIFICATE OF CORRECTION

PATENT NO. : 10,293,420 B2
APPLICATION NO. : 14/716623
DATED : May 21, 2019
INVENTOR(S) : Wuzheng Duan et al.

It is certified that error appears in the above-identified patent and that said Letters Patent is hereby corrected as shown below:

In the Claims

In Claim 6, at Column 8, Line 11, please add a "," between "a rear edge of a blade" and "the rear blade guide. . ."

Signed and Sealed this
Second Day of July, 2019

Andrei Iancu
*Director of the United States Patent and Trademark Office*